Jan. 22, 1957   J. T. KIMBRELL   2,778,223
FLOWMETER
Filed Nov. 2, 1953
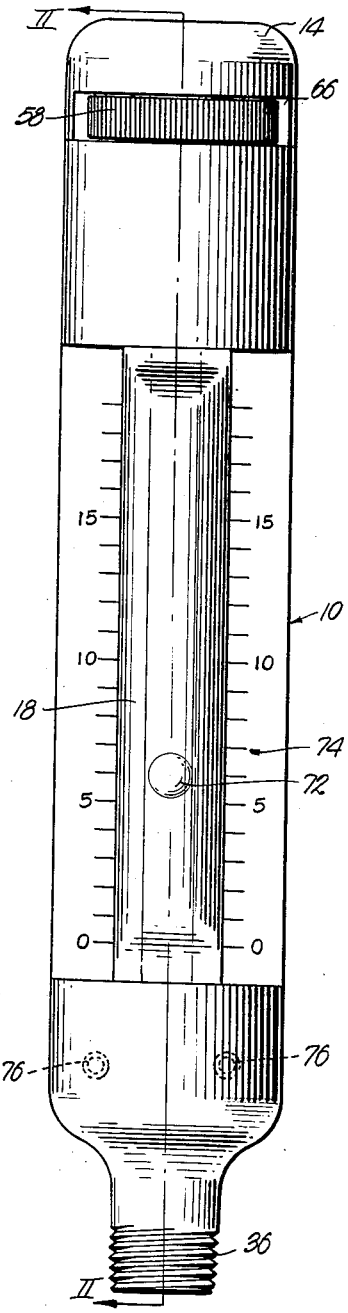
Fig. 1.
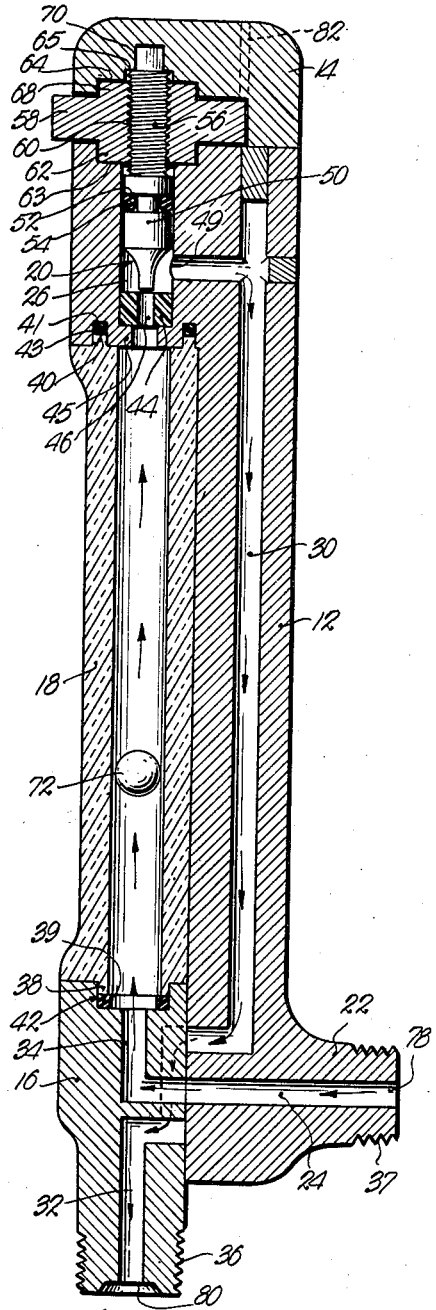
Fig. 2.
INVENTOR.
Jack T. Kimbrell
BY
ATTORNEY.

United States Patent Office 2,778,223
Patented Jan. 22, 1957

2,778,223
FLOWMETER

Jack T. Kimbrell, Overland Park, Kans., assignor to Puritan Compressed Gas Corporation, Kansas City, Mo., a corporation of Missouri Application November 2, 1953, Serial No. 389,799

1 Claim. (Cl. 73—209)

This invention relates to fluid metering devices, and more particularly to flow-meters used in conjunction with therapeutic devices for measuring the rate of flow from a pressure controlled gas supply line to a point of application, such as an anesthetic machine or an oxygen mask.

The primary object of the present invention is the provision of a metering device having a flow-responsive float within a transparent tube for accurately determining the rate of flow of gas in such a system and permitting visual observation of the measurement made.

Another important object of the present invention is to provide a flow-meter which is adapted for ready insertion in the gas supply line, and including valve means for controlling the flow of gas therethrough, the relationship of parts being such that the float within the tube is responsive to the controlled pressure of the supply line and not subject to the fluctuations in pressure which usually occur at the point of application.

Other objects and advantages of the present invention will become apparent from the specification which follows, and from the accompanying drawing, wherein:

Figure 1 is an elevational view of the flow-meter of the present invention; and

Fig. 2 is a sectional view taken on line II—II of Fig. 1.

Reference will now be had to the accompanying drawing, wherein a flow-meter embodying the principles of the present invention is illustrated and broadly designated by the numeral 10. The flow-meter 10 comprises an elongated body 12, removable end sections 14 and 16, transparent flow tube 18, and the control valve broadly designated by the numeral 20, the last two mentioned elements being utilized for measuring and controlling the rate of flow of gas through the flow-meter.

The elongated body 12 has a threaded projection 22 which is adapted to receive the coupling means (not here shown) utilized for insertion of the flow-meter 10 in a pressure-controlled gas supply line, and a passage or duct 24, for the flow of gas into the meter. The body 12 is additionally provided with a bore 26, which is adapted to receive valve assembly 20. C-shaped passage 30 is bored in the body 12 and communicates with bore 26, via aperture 49 to provide an outlet for the gas emanating from the measuring tube 18.

End section 16 has bored passages 32 and 34, in communication with passage 30 and duct 24 respectively. Section 16 is threaded as at 37 to receive coupling means (not shown) for insertion of the flow-meter 10 in the line to the point of application and at 36 to facilitate connection thereof to a suitable discharge line.

The elongated, transparent flow tube 18 has extended portions 38 and 40 adapted to fit within the annular recess 41 of body 12 and within enlarged portion 42 of duct 34. The tube 18 is sealed by O-rings 43 and 39 respectively.

The valve assembly 20 includes a valve seat 44, preferably made of nylon, resting on annular flange 45 within bore 26 of body 12, and having a central perforation 46. The tapered valve head 50, slotted as at 52 for the reception of O-ring 54, and having threaded stem 56, is reciprocable in bore 26. Similarly, the disc 58 is bored and threaded as at 60 to receive the stem 56. Thus, rotation of the disc 58 imparts vertical reciprocation to valve head 50, causing it to move into and out of the perforation 46 of valve seat 44. Hub 62 of disc 58 engages the counterbored surface 63 to prevent downward movement of the disc 58 with relation to body 12, when the disc is rotated to reciprocate the valve assembly 20.

Removable end section 14 of elongated body 12 is cut away as at 66 to clear rotatable disc 58. Hub 68, on the opposite side of disc 58 from hub 62, fits within counterbore 64 in end section 14, when the latter is fastened in place on body 12, and upward movement of the disc relative to stem 56, as the disc 58 is rotated, is limited by engagement of the latter with counterbored surfaces 64 and 65. Upward movement of stem 56 is limited by the depth and shape of cavity 70 in end section 14.

A spherical float 72, preferably a steel ball, is of smaller diameter than the longitudinal, tapered passage through transparent tube 18. As gas flows upwardly through the tube, the float 72 rises to some position above the bottom of the tube 18 where the flow of gas around the outside of the float 72 is sufficient to cause suspension of the float within the moving body of gas, its position above the bottom of the tube giving an indication of the rate of flow of fluid through the tube at the particular pressure prevailing at the supply end of the tube. The rise and fall of the float 72 may be shown on a suitable scale provided on elongated body 12 adjacent tube 18, as illustrated in Fig. 1 of the drawing. The particular flow-meter illustrated in Fig. 1, is calibrated as at 74 in liters per minute.

The first step in the assembly of the flow-meter illustrated in the accompanying drawing, is to place a float 72 within the tube 18. The extended portion 40 of tube 18 is then fitted within recess 41 of body 12 containing O-ring 43. Sealing ring 39 is placed within portion 42 of end section 16 before the latter is fitted over extension 38 on tube 18. When the end section 16 has been fastened to the body 12 by means of screws 76, the inlet duct 24, leading from inlet port 78, is in alignment with passage 34 in end section 16, and passage 32, leading from outlet port 80, by-passes duct 24, and is in alignment with passage 30 in body 12.

In assembling the flow-meter 10, the next step is to force the valve seat 44 within bore 26, until it rests on the flange 45. Valve head 50, with O-ring 54 in place, is fitted into the bore 26. Disc 58 is placed within the cutaway portion 66 of end section 14, and the disc then threaded on valve stem 56 until hub 62 of the disc 58 engages surface 63. End section 14 is fastened to body 12 by means of screws 82, shown by dash lines in Fig. 2, which pass through end section 14 and enter body 12.

In operation, the flow-meter 10 is placed in a gas supply line between a pressure-controlled means and a point of application, neither of which is shown, so that pressurized gas enters the port 78, passes through passage 34, tube 18, perforation 46, aperture 49, passage 30—32, and outlet port 80. The rate of flow of gas through the flow-meter 10 is controlled by the position of tapered valve head 50 with relation to perforation 46. The position of float 72, opposite calibrations 74, as gas flows, gives a visual indication of the rate of flow within the flow-meter 10. As previously stated, rotation of disc 58 imparts reciprocation to valve head 50, to control the quantity of gas delivered to the point of application.

By positioning the valve assembly 20 at the outlet side of the flow tube 18, the float 72 is always under the controlled pressure of the supply line, and is not subject to fluctuations that generally occur in discharge lines or to the back pressure from the point of application.

In previous flow-meters intended for use with therapeutic devices, it has been customary to place the control valve either at the inlet side of the flow tube or in the gas supply line. Such location has led to erroneous readings of the quantity of gas delivered.

Since these fluctuations in the discharge line are not subject to control, it has previously been impossible to obtain an accurate reading of the quantity of gas delivered. By placing the control valve assembly 20 at the discharge side of the flow tube 18, in accordance with the principles of my present invention, the flow tube 18 can be calibrated for a given pressure, so that, in use, the only variable force acting on the float 72 is the quantity of the gas passing therethrough. In this manner an accurate reading of the rate of flow through the tube 18 is possible.

It is apparent that the flow-meter described is subject to many changes and modifications, and those that fairly come within the scope of the invention as defined by the appended claim, are manifestly contemplated hereby.

Having thus described the invention, what is claimed as new and desired to be secured by Letters Patent is:

A flow meter comprising an elongated, normally upright, transparent, cylindrical measuring tube having a longitudinal, downwardly tapered gas passage therethrough and an annular extended portion on each end thereof respectively; a substantially L-shaped metallic body having an upper leg portion overlying the uppermost end of the tube and a substantially longer lower leg portion extending downwardly alongside the tube to a level below the lowermost end of the latter, said upper leg having an annular recess therein for receiving the uppermost extended portion of the tube, there being an elongated upper vertical bore in said upper leg in alignment with the passage and an inturned annular flange on said upper leg extending into the bore at the lowermost end of the latter presenting a shoulder, said upper leg having an upper horizontal bore communicating with said upper vertical bore intermediate the ends of the latter, there being an intermediate horizontal bore within the lower leg and a lower horizontal bore through the lower leg adjacent the lowermost end thereof, there being an elongated vertical bore interconnecting said upper and intermediate horizontal bores; an end section secured to the lowermost end of the lower leg immediately below the lowermost end of the tube and provided with an annular recess for receiving the lowermost extended portion of the tube, said section having an inlet port communicating with said lowermost horizontal bore and an outlet port, there being ducts in said section interconnecting the inlet port with the lowermost end of the passage and the outlet port with the intermediate horizontal bore respectively; a ring of resilient plastic material snugly fitted within the upper vertical bore and resting on the shoulder to present a valve seat; a valve within the upper vertical bore and having a lowermost downwardly tapered valve head, said valve being reciprocable to and from a position engaging the seat and closing the passage, said valve having an intermediate reduced portion of lesser diameter than the greatest diameter of said head; an O-ring in said reduced portion for slidingly engaging the walls of the upper vertical bore; an externally threaded vertical stem secured to the uppermost end of the valve; a horizontal disposed hub complementally threaded on said stem, there being an opening in one face of the upper leg exposing a portion of the hub, whereby the valve may be reciprocated by rotation of the hub upon the stem; a cap section; means releasably attaching the cap section to the uppermost end of the upper leg in closing relationship to said upper vertical bore for limiting reciprocation of the valve away from the seat; a metallic ball within the passage responsive to flow of gas therethrough, the diameter of said ball being smaller than the smallest diameter of the passage; and calibrated means on the outermost face of the lower leg adjacent the tube for indicating the rate of flow of gas through the meter as a function of the position of the ball.

References Cited in the file of this patent

UNITED STATES PATENTS

| | | |
|---|---|---|
| 1,498,805 | Oberman | June 24, 1924 |
| 1,794,442 | Cannon | Mar. 3, 1931 |
| 1,899,764 | Machlet | Feb. 28, 1933 |
| 2,457,297 | Aller | Dec. 28, 1948 |
| 2,655,041 | Jacobsson | Oct. 13, 1953 |

FOREIGN PATENTS

| | | |
|---|---|---|
| 384,167 | France | Jan. 28, 1908 |
| 332,354 | Germany | Jan. 28, 1921 |

OTHER REFERENCES

Page 103 of the Review of Scientific Instruments, vol. 28, issue 2, pub. February 1952. (A copy is in the Scientific Libary of the Patent Office and a photostat is in Div. 36.)